Oct. 30, 1962 D. S. CAMPBELL Re. 25,273

SELECTIVE TRAVEL DRAFT GEAR WITH INCREASED TRAVEL IN BUFF

Original Filed March 23, 1953 4 Sheets-Sheet 1

INVENTOR.
David S. Campbell
BY
Mann, Brown and Hardaway
Attys

Oct. 30, 1962 D. S. CAMPBELL Re. 25,273

SELECTIVE TRAVEL DRAFT GEAR WITH INCREASED TRAVEL IN BUFF

Original Filed March 23, 1953

4 Sheets-Sheet 2

INVENTOR.

David S. Campbell

BY

Mann, Brown and Hansmann

Attys.

SELECTIVE TRAVEL DRAFT GEAR WITH INCREASED TRAVEL IN BUFF

Original Filed March 23, 1953 4 Sheets-Sheet 3

INVENTOR.
David S. Campbell
BY
Mann, Brown and Hartmann
Attys.

SELECTIVE TRAVEL DRAFT GEAR WITH INCREASED TRAVEL IN BUFF

Original Filed March 23, 1953 4 Sheets-Sheet 4

INVENTOR.
David S. Campbell
BY
Mann, Brown, and Hansmann
Atty's.

United States Patent Office

Re. 25,273
Reissued Oct. 30, 1962

25,273

SELECTIVE TRAVEL DRAFT GEAR WITH INCREASED TRAVEL IN BUFF

David S. Campbell, Glen Ellyn, Ill., assignor to Cardwell Westinghouse Company, a corporation of Delaware Original No. 2,728,465, dated Dec. 27, 1955, Ser. No. 344,131, Mar. 23, 1953. Application for reissue Dec. 23, 1957, Ser. No. 704,849
10 Claims. (Cl. 213—44)

Matter enclosed in heavy brackets [ ] appears in the original patent but forms no part of this reissue specification; matter printed in italics indicates the additions made by reissue.

This invention relates to draft gears for railroad cars, and has for its principal object to increase the possible travel in buff, and thus give better cushioning to the car and the lading.

Generally speaking, this is accomplished by offsetting the draft gear toward the end of the car to let the couple horn go an increased distance from the striking plate when the draft gear is released.

Further objects and advantages of the invention will become apparent as the description is read in connection with the accompanying drawings, in which—

But these drawings and the corresponding description are for the purpose of illustrative disclosure only, and are not intended to impose unnecessary limitations on the claims.

Figure 1:
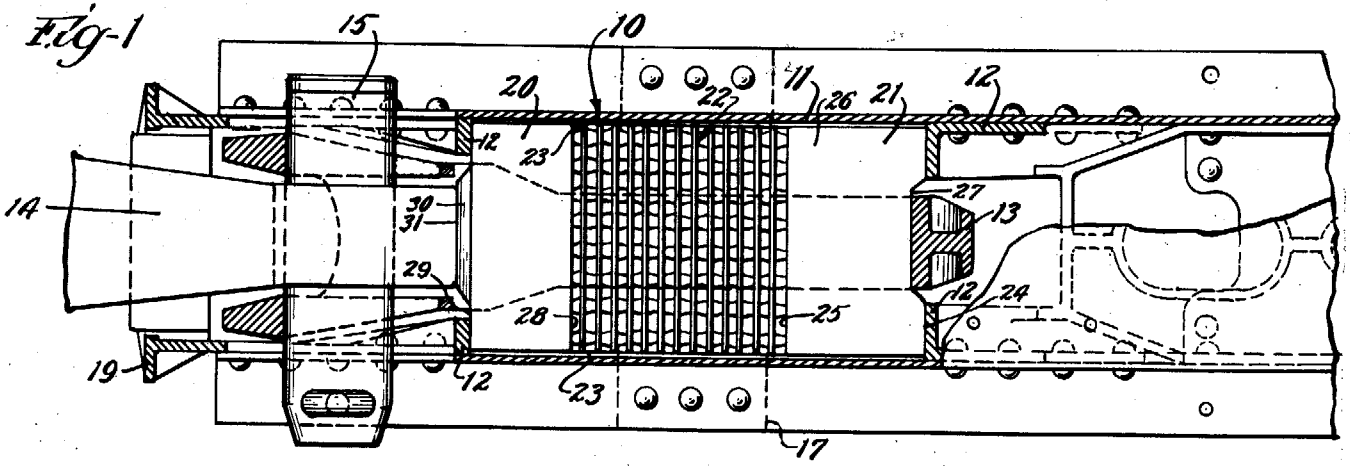
FIG. 1 is a horizontal section through familiar parts of a freight car showing the draft gear applied.
Figure 2:
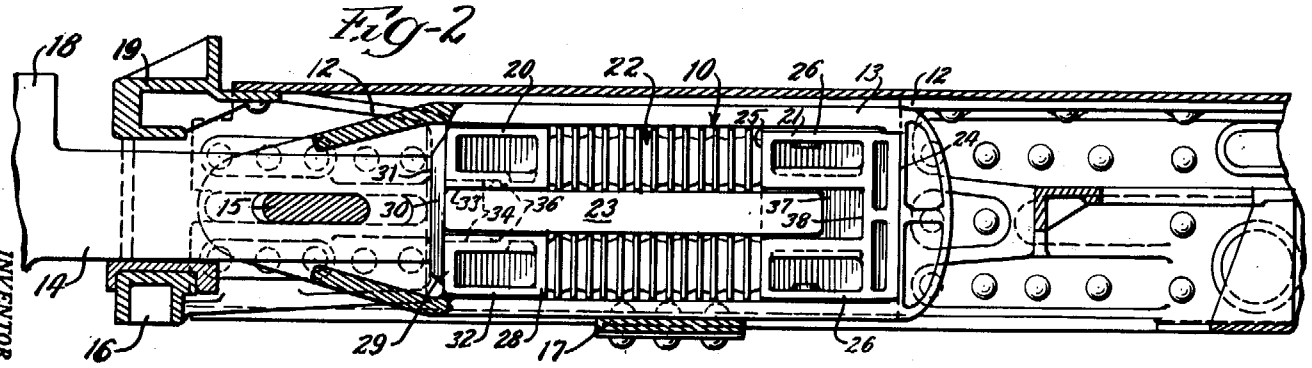
FIG. 2 is a vertical section of the same.
Figure 10:
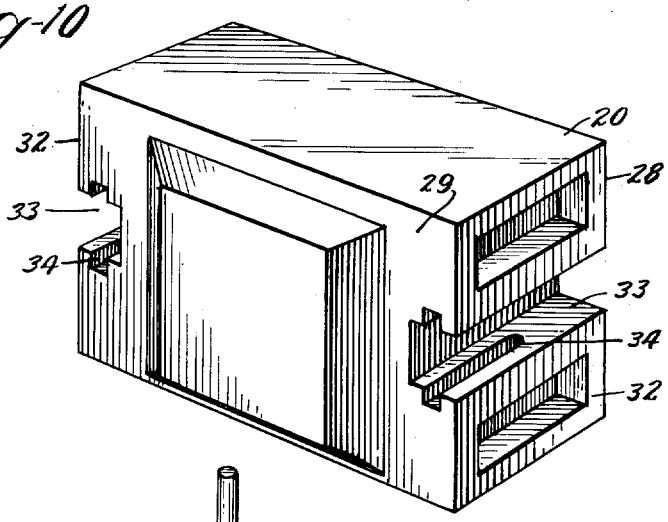
FIG. 10 is a perspective view of the front or outer draft gear housing.
Figure 11:
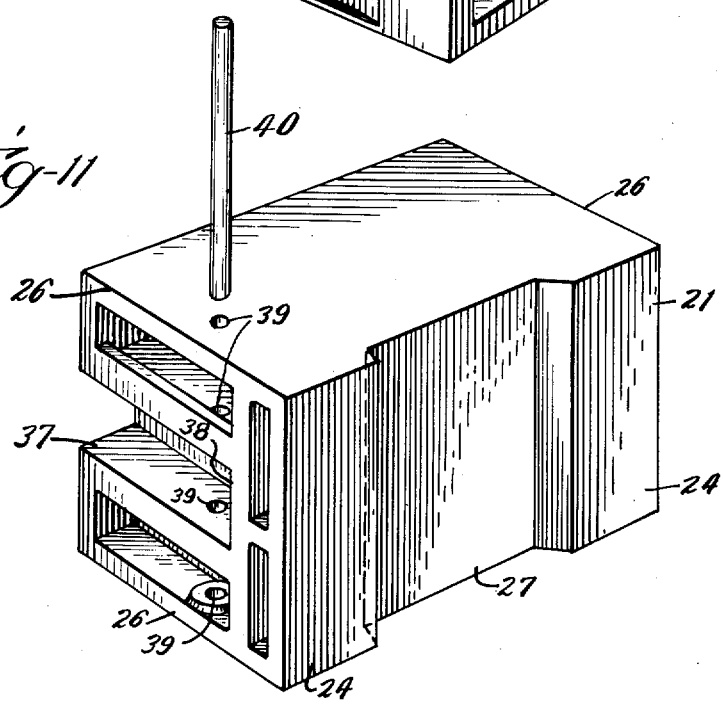
FIG. 11 is a perspective view of the rear or inner draft gear housing and a shear pin used to hold temporarily the draft gear compressed for handling, shipping, and installing.

In FIGS. 1 and 2, the draft gear indicated generally by 10 is shown in the familiar surroundings of center sills 11, draft lugs 12, draft yoke 13, coupler butt or shank 14, draft key 15, coupler carrier iron 16, draft gear carrier iron 17, coupler horn 18, and striking plate 19 (all corresponding to Fig. 10.51 of the Car Builders' Cyclopedia, 1946, p. 944). These parts are so familiar that no specific description is thought necessary.

The draft gear includes filler blocks in the form of an outer or front housing 20, an inner or rear housing 21, a cushioning element 22 between the housings, and side bars or thrust columns 23.

The inner or rear housing includes a rear wall 24 to cooperate with the rear draft gear lugs 12 and a front wall 25 to cooperate with the cushioning element 22, the walls 24 and 25 being connected by side walls 26.

Figure 3:
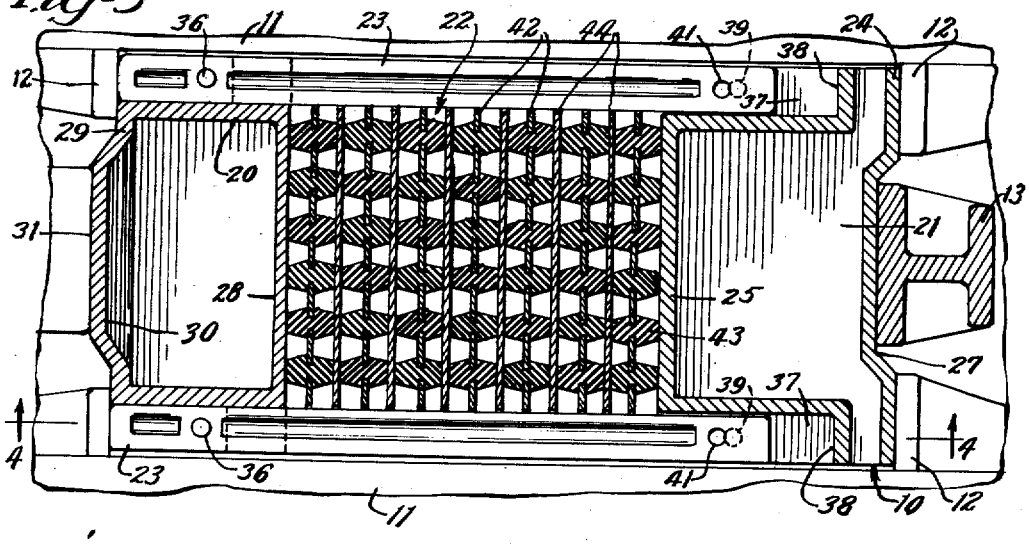
FIG. 3 is an enlarged horizontal section through the draft gear and portions of the draft yoke, center sills, and draft lugs.
Figure 4:
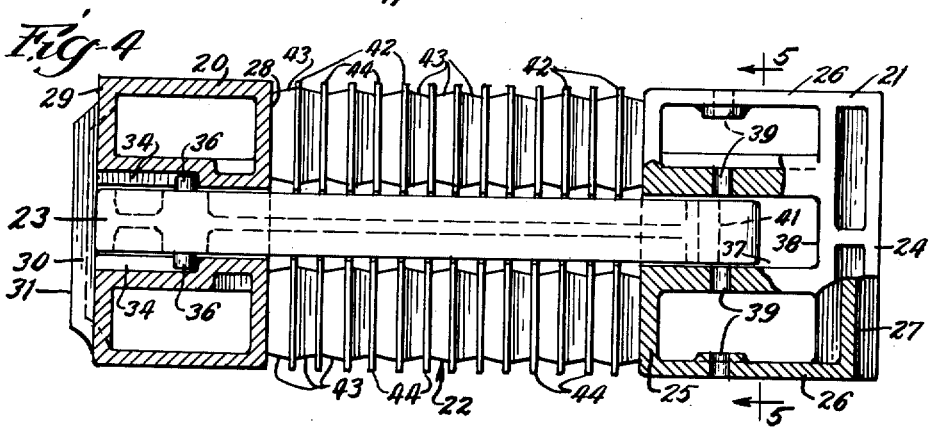
FIG. 4 is a vertical section on the line 4—4 of FIG. 3.
Figure 5:
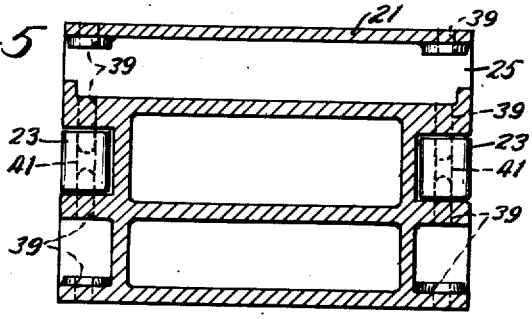
FIG. 5 is a vertical section on the line 5—5 of FIG. 4.
Figure 6:
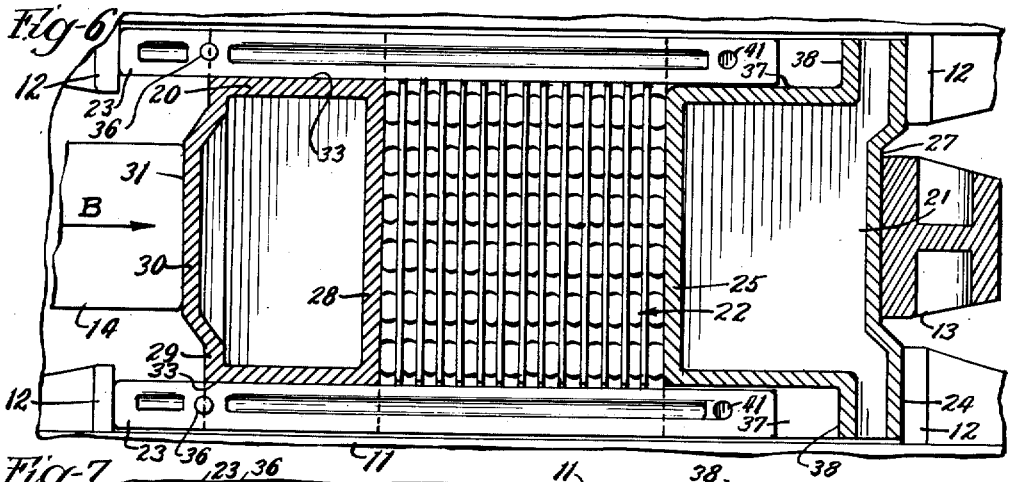
FIG. 6 is a horizontal section showing the relations of the relevant parts in buff.
Figure 7:
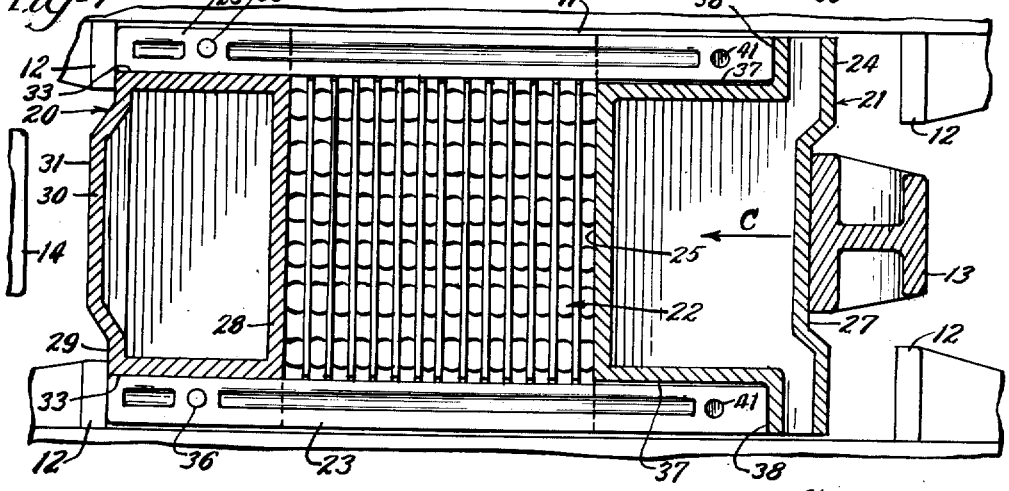
FIG. 7 is a similar view of the parts in draft.
Figure 8:
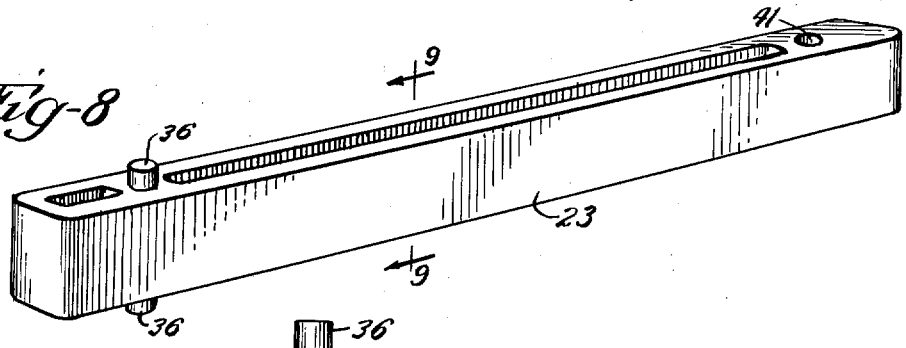
FIG. 8 is a perspective view of a side bar or thrust column, two of which are used in the draft gear shown.
Figure 9:
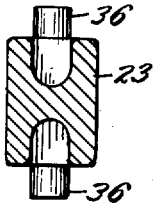
FIG. 9 is a cross section on the line 9—9 of FIG. 8.

The inner or rear wall 24 is offset forwardly or toward the end of the car as shown at 27 wide enough to receive the draft gear yoke 13, as shown in FIGS. 3, 6, and 7.

The front or outer housing 20 includes an inner or rear wall 28 to cooperate with the cushioning element 22 and a front wall 29 to cooperate with the front draft gear lugs 12. The front wall 29 is offset outwardly or toward the end of the car, as indicated at 30, a distance corresponding to the offset 27 and presenting a face 31 to cooperate with the inner end of the coupler butt or shank 14 in buff.

The walls 28 and 29 of the front or outer housing 20 are connected by side walls 32 having passageways 33 and grooved channels 34 to receive the forward or outer ends of the side bars or thrust columns 23 and projecting lugs 36.

The side walls 26 of the rear or inner housing 21 are provided with passages 37 ending in buttresses 38 and also with vertical openings 39 to receive shear pins 40 adapted to be inserted through the openings 39 and an opening 41 in the rear ends of the side bars 23 to hold the draft gear assembled with the cushioning element 22 under sufficient compression to enable the draft gear to be inserted in the draft gear pocket between the center sills 11 and the draft gear lugs 12.

The cushioning element 22 may be of any selected type, but is here shown as the rubber spring type composed of a plurality of perforated plates 42 and rubber bars 43 on each side of the plates 42 and spacer plates 44. A variety of such rubber spring cushioning elements are known, and no detailed description is deemed necessary. Specifications on the order of those given in Tucker Serial No. 223,746, filed April 30, 1951, *now Patent No. 2,720,319, issued October 11, 1955,* may be used.

It will be seen from the drawings (particularly FIGS. 1, 2, 3, 6, and 7) that, on account of the offsets 27 and 30 in the housings 20 and 21, the draft gear yoke, and therefore the coupler, is allowed to go endwise to the car an increased distance over that commonly allowed, which spaces the coupler horn 18 and an increased distance from the striking plate 19 when the draft gear is in full release.

Upon receiving buffing force indicated by the arrow B in FIG. 6, the coupler butt acts against the front face 31 of the front housing 20, forces that housing against the cushioning element 22, and that element in turn against the rear housing 21, and the inner wall 24 which will be held by the inner draft lugs 12. It will thus be clear that in buff the coupler horn can travel an increased distance over heretofore standard practice corresponding to the extent of the offsets 27 and 30. That additional travel, while the cushioning unit is being compressed, provides additional protection of the car and the lading in buff.

As shown in FIG. 7, when draft is applied, as indicated by the arrow C, the rear housing 21 moves toward the end of the car while the cushioning unit 22 is compressed until the buttresses 38, striking the inner ends of the thrust members 23, force their outer ends against the front draft lugs 12.

In one form of the improved draft gear that has been found satisfactory, the arrangement gives up to 3¼″ travel in buff as compared with 2⅝″ to 2¾″ in prior devices, and gives up to 2″ travel in draft—in all, a total travel of 5¼″, which is still less than 5½″ now allowed by the Association of American Railroads, and leaves ¼″ travel that makes a great factor of safety with rubber under that state of compression.

The draft gear, including the front and rear housings, the cushioning element, and the two side bars 23 are readily assembled under initial compression and made fast by inserting shear pins 40 through openings 39 and 41, when the draft gear will be a unit for storing, shipping, handling, and is readily inserted into the draft gear pocket and supported by the draft gear carrier. The first considerable shock will shear the pins 40 and release the parts for normal operations described.

The key to the longer travel in buff lies in letting the draft gear yoke and the coupler go forward or outward and space the coupler horn farther away from the striking plate than is possible in prior devices. Offsetting or notching the inner housing is a simple way to permit the increased travel in release, and offsetting or extending the front housing beyond the faces of the front draft lugs makes the cushioning element move the coupler forward in release and resist reverse movement in buff. Many equivalent expedients will give like results.

Embodiments of this invention, either with a rubber cushioning element or any other, are interchangeable with standard equipment, because the draft gear pocket remains the same.

In the particular construction shown in the drawing, and more particularly in FIGS. 1, 3, 6, and 7, the rubber cushioning element of suitable capacity does not require the full length of the standard draft gear pocket, and the excess is taken up in the housings 20 and 21. If a suitable friction or other cushioning element replaced the rubber spring element 10, there might be less requirement for taking up space in the corresponding housings or followers.

The space between the center sills of the car and the distance between the faces of the draft gear lugs is set by requirements of the Association of American Railroads, and fixes the size of the draft gear pocket for cars used in interchange. The particular embodiment of the invention shown in these drawings fits this novel draft gear into that pocket, and furnishes the extra travel described. In embodying other cushioning elements, the disclosure will furnish sufficient guide.

I claim:

1. In a draft gear having a striking plate, the combination of a pair of thrust bars, inner and outer housings therefor with a cushioning element operatively positioned between the housings, the inner face of the inner housing being offset toward the cushioning element wide enough to receive a draft gear yoke, and the outer face of the outer housing being offset outwardly away from the cushioning element an amount corresponding to the offset of the inner housing, whereby upon release of the draft gear an associated draft gear yoke and coupler having a horn may go outwardly an increased distance corresponding to the offsets in the housings and provide a correspondingly additional travel of the coupler horn to the striking plate under buff.

2. In a draft gear, the combination of a pair of thrust bars, inner and outer housings therefor, means connecting one end of each thrust bar to one of the housings, and a cushioning element operatively positioned between the housings, the inner face of the inner housing being offset toward the cushioning element wide enough to receive a draft gear yoke, the outer face of the outer housing being offset outwardly away from the cushioning element an amount corresponding to the offset of the inner housing, and means to hold the same assembled with the cushioning element under enough compression to bring the draft gear within the length of the draft gear pocket, said last named means comprising shear pins extending through aligned holes in the other ends of the thrust bars and the other housing.

3. In a draft gear, inner and outer housings, a cushioning element operatively positioned between them, the inner face of the inner housing being offset toward the cushioning element wide enough to receive a draft gear yoke, the outer face of the outer housing being offset outwardly away from the cushioning element an amount corresponding to the offset of the inner housing, sides of said housings having aligned passages, and thrust means in said passages comprising bars each having one end connected to one of said housings and having its other end engageable by the other housing on compression of the cushioning element.

4. In a draft gear, inner and outer housings, a cushioning element operatively positioned between them, the inner face of the inner housing being offset toward the cushioning element wide enough to receive a draft gear yoke, the outer face of the outer housing being offset outwardly away from the cushioning element an amount corresponding to the offset of the inner housing, said housings having aligned passages, thrust bars in said passages with one end of each connected to one of said housings, and shear means fastening the other end of each thrust bar to the other housing.

5. In a draft gear, an inner housing having a portion of its inner face offset outwardly along a transverse distance wide enough to receive the outer face of the inner end of a draft gear yoke, and having a passage in each of its sides each of which is open at one end to receive the end portion of a thrust column and closed at its other end by a buttress for the terminal end of said thrust column.

6. In a draft gear, a front filler block having a rear wall adapted to engage a cushioning element and a front wall adapted to engage draft lugs, said front wall having a forwardly offset area adapted to be engaged by a coupler butt.

*7. In a railway cushioning mechanism for mounting in the draft pocket of a railway car frame, said pocket having front and rear stops; longitudinally movable front and rear follower members disposed in said pocket for transmitting draft and buff loads, respectively, to said front and rear stops, respectively; cushioning means interposed between said members for undergoing a certain longitudinal closure travel in opposing relative longitudinal movement therebetween, and secondary stop means flanking said front follower member, with said front follower member having a configuration providing longitudinally unimpeded clearance space aligned longitudinally with said secondary stop means to accommodate relative longitudinal sliding movement between said front follower member and said secondary stop means in an amount at least equal to said certain closure travel, and said secondary stop means being disposed in said pocket to engage directly between said car frame and said rear follower member to limit forward movement of said rear follower member to a predetermined amount less than said certain closure travel.*

*8. In a railway cushioning mechanism for mounting in the draft pocket of a railway car frame, said pocket having front and rear stops; longitudinally movable front and rear follower members disposed in said pocket for transmitting draft and buff loads, respectively, to said front and rear stops, respectively; said rear follower member having at its rearward end a transverse wall for engagement with the rear stops, cushioning means interposed between said members for undergoing a certain longitudinal closure travel in opposing relative longitudinal movement therebetween, and secondary stop means flanking said front follower member, with said front follower member having a configuration providing longitudinally unimpeded clearance space aligned longitudinally with said secondary stop means to accommodate relative longitudinal sliding movement between said front follower member and said secondary stop means in an amount at least equal to said certain closure travel, and said secondary stop means being disposed in said pocket to engage directly between said car frame and said rear follower member to limit forward movement of said rear follower member to a predetermined amount less than said certain closure travel.*

*9. In a draft gear arrangement for mounting in the draft pocket of a railway car frame with a coupler-yoke encircling the gear arrangement, said pocket having longitudinally spaced apart front and rear stops, resiliently yieldable cushioning means in said pocket for longitudinal closure and release therein and acting in its entirety for cushioning both buff and draft loads, longitudinally movable front and rear follower means disposed in said pocket to abut said cushioning means at opposite ends thereof, said cushioning means biasing said front and*

*rear follower means longitudinally against said front and rear stops, respectively, said front and rear follower means, respectively, having forwardly and rearwardly facing abutment surfaces directly engageable with said coupler-yoke for receiving buff and draft loads, respectively, said rear follower means having portions extending traversely of said cushioning means, and rigid secondary stop means disposed longitudinally between said front stops and said portions of said rear follower means and in flanking relation to said front follower means for accommodating longitudinal travel of said front follower means relative to said secondary stop means when the gear arrangement is acting in buff, said front follower means having a configuration providing a longitudinally unimpeded clearance space aligned longitudinally with said secondary stop means to permit said secondary stop means to engage in direct abutment between said front stops and said portions of said rear follower means to form a rigid column positively limiting draft travel of said gear arrangement to an amount less than the buff travel thereof.*

*10. In a draft gear arrangement for mounting in the draft pocket of a railway car frame with a coupler-yoke encircling the gear arrangement, said pocket having longitudinally spaced apart front and rear stops presenting, respectively, forwardly and rearwardly facing opposed abutment surfaces; resiliently yieldable cushioning means in said pocket for longitudinal closure and release therein and acting in its entirety for cushioning both buff and draft loads, longitudinally movable front and rear follower means disposed in said pocket to abut said cushioning means at opposite ends thereof, said front follower means including portions at opposite sides thereof for abutment with part only of said abutment surfaces of said front stops, with the remainder of said last-mentioned surfaces being exposed, said rear follower means having portions extending transversely into longitudinally spaced apart, longitudinally overlying relation with at least part of said exposed remainder of said abutment surfaces*

*of said front stops, said cushioning means biasing said front and rear follower means into abutment longitudinally against said front and rear stops, respectively, to define longitudinally extending regions along opposite sides of said pocket, said regions being bounded at opposite ends thereof by said exposed remainder of said abutment surfaces of said front stops and by said portions of said rear follower means that overlie said exposed remainder, said front and rear follower means, respectively, having forwardly and rearwardly facing abutment surfaces for engagement with said coupler-yoke for receiving buff and draft loads, respectively, and rigid thrust-column means cooperating with said rear follower means at opposite sides of said pocket and disposed in said regions in straight, longitudinally extending, longitudinally movable flanking relation to said front follower means for accommodating longitudinal travel of said front follower means relative to said thrust-column means when the gear arrangement is acting in buff, said thrust-column means providing direct abutment between said front stops and said rear follower means for positively limiting draft travel of said gear arrangement and being of a length to fill a part only of said regions and define, when said front and rear follower means are biased into abutment against said front and rear stops, respectively, a longitudinal clearance accommodating draft travel of said rear follower means, said clearance being of less dimension than the buff closure travel of said gear arrangement.*

References Cited in the file of this patent or the original patent

UNITED STATES PATENTS

| | | |
|---|---|---|
| 1,228,830 | Schmidt | June 5, 1917 |
| 1,876,019 | Priebe | Sept. 6, 1932 |
| 2,039,268 | Barrows | Apr. 28, 1936 |
| 2,184,936 | Clark | Dec. 26, 1939 |
| 2,197,030 | Clark | Apr. 16, 1940 |
| 2,527,589 | Spence et al. | Oct. 31, 1950 |